United States Patent
Heim

(10) Patent No.: US 9,431,861 B2
(45) Date of Patent: Aug. 30, 2016

(54) FIXING PERMANENT MAGNETS TO A ROTOR

(71) Applicant: Siemens Aktiengesellschaft, München (DE)

(72) Inventor: Bruno Heim, Grosseibstadt (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 224 days.

(21) Appl. No.: 13/936,906

(22) Filed: Jul. 8, 2013

(65) Prior Publication Data

US 2014/0009024 A1 Jan. 9, 2014

(30) Foreign Application Priority Data

Jul. 9, 2012 (EP) .................................. 12175527

(51) Int. Cl.
*H02K 1/27* (2006.01)
*H02K 1/28* (2006.01)

(52) U.S. Cl.
CPC ............ *H02K 1/2786* (2013.01); *H02K 1/278* (2013.01); *H02K 1/28* (2013.01)

(58) Field of Classification Search
CPC .................. H02K 1/278; H02K 1/28; H02K 1/27–1/178
USPC ........................................ 310/156.01–156.84
See application file for complete search history.

(56) References Cited

U.S. PATENT DOCUMENTS

| | | | |
|---|---|---|---|
| 4,697,114 A * | 9/1987 | Amemiya et al. | 310/156.61 |
| 6,727,629 B1 * | 4/2004 | Soghomonian et al. | 310/254.1 |
| 6,731,028 B2 | 5/2004 | Derleth et al. | |
| 6,787,950 B2 | 9/2004 | Heim | |
| 7,365,465 B2 * | 4/2008 | Ludwig | 310/156.12 |
| 7,768,168 B2 * | 8/2010 | Aschoff et al. | 310/156.22 |
| 8,022,584 B2 | 9/2011 | Heim | |
| 2002/0047480 A1 | 4/2002 | Heim | |
| 2002/0135245 A1 | 9/2002 | Derleth et al. | |
| 2003/0193255 A1 | 10/2003 | Ludwig et al. | |
| 2007/0069591 A1 * | 3/2007 | LeFlem | F03B 13/16 310/12.12 |
| 2009/0140614 A1 | 6/2009 | Heim | |
| 2009/0224627 A1 * | 9/2009 | Hino et al. | 310/216.077 |
| 2009/0273254 A1 | 11/2009 | Heim | |
| 2010/0187943 A1 | 7/2010 | Heim | |

FOREIGN PATENT DOCUMENTS

| | | |
|---|---|---|
| CA | 2483628 A1 | 12/2003 |
| CN | 101604898 A | 12/2009 |
| DE | 10 2 16 856 | 11/2003 |
| DE | 10216856 B4 | 6/2005 |
| EP | 2149965 A1 | 2/2010 |
| GB | 2117188 A | 10/1983 |
| JP | 2000232743 A | 8/2000 |
| WO | PCT/US03/08674 | 12/2003 |

* cited by examiner

Primary Examiner — Thomas Truong
(74) Attorney, Agent, or Firm — Henry M. Feiereisen LLC

(57) ABSTRACT

A rotor for an electrical machine includes a base body, a plurality of permanent magnets which are arranged axially in rows on an outer surface of the base body. At least two of the permanent magnet rows are arranged so as to be mutually offset in an axial direction. First and second locking plates are respectively arranged at axial end faces of the base body to secure the rows of permanent magnets in the axial direction, with the first and second locking plates each having a surface which rests on respective axial ends of the permanent magnet rows. A bandage is wound around the base body to fix the permanent magnets to the outer surface of the base body.

10 Claims, 2 Drawing Sheets

FIXING PERMANENT MAGNETS TO A ROTOR

CROSS-REFERENCES TO RELATED APPLICATIONS

This application claims the priority of European Patent Application, Serial No. 121 75 527, filed Jul. 9, 2012, pursuant to 35 U.S.C. 119(a)-(d), the content of which is incorporated herein by reference in its entirety as if fully set forth herein.

BACKGROUND OF THE INVENTION

The present invention relates to a rotor for an electrical machine.

The following discussion of related art is provided to assist the reader in understanding the advantages of the invention, and is not to be construed as an admission that this related art is prior art to this invention.

Rotors or armatures can be used for servomotors, for example, and in particular for motors having high rotational speeds. Armatures featuring external magnets are normally bandaged using tape made of tear-resistant materials. Locking plates are normally used to hold the start and the end of the bandage in the case of laminated armatures. On most armatures, the start and the end of the bandage start and end at locking plates due to the small air gap. These locking plates fit closely against the plane surfaces of the armature end faces. Due to length tolerances in the laminated core and length tolerances of the magnets, gaps remain between the magnets and between magnet and locking plate.

The magnets are conventionally distributed axially along the length of the armature between the locking plates. For process engineering reasons, it has not been possible to avoid axial gaps until now. During unilateral location of the magnets, the magnets were conventionally placed on one of the locking plates unilaterally, and the resulting gap between the magnets and the insulating plate was partially filled by an additional element (similar to an O-ring). Owing to the circumferential gaps that are inevitably formed due to the nature of the process, the bandage applied under pretension is partially pulled between the magnets and/or between magnet and locking plate in a circumferential direction. As a consequence of the bandage tape being partially pulled into the gap, the possible tension when bandaging the armature is limited, and magnets are displaced from their ideal position in some cases.

It would therefore be desirable and advantageous to provide an improved rotor for an electrical machine to obviate prior art shortcomings and to allow operation at a particularly high rotational speed.

SUMMARY OF THE INVENTION

According to one aspect of the present invention, a rotor for an electrical machine includes a base body, a plurality of permanent magnets arranged axially in rows on an outer surface of the base body, at least two of the permanent magnet rows being arranged so as to be mutually offset in an axial direction, first and second locking plates respectively arranged at axial end faces of the base body to secure the rows of permanent magnets in the axial direction, the first and second locking plates each having a surface which rests on respective axial ends of the permanent magnet rows, and a bandage wound around the base body to fix the permanent magnets to the outer surface of the base body.

According to another aspect of the present invention, an electrical machine includes a rotor having a base body, a plurality of permanent magnets arranged axially in rows on an outer surface of the base body, at least two of the permanent magnet rows being arranged as to be mutually offset in an axial direction, first and second locking plates respectively arranged at axial end faces of the base body to secure the rows of permanent magnets in the axial direction, the first and second locking plates each having a surface which rests on respective axial ends of the permanent magnet rows, and a bandage wound around the base body to fix the permanent magnets to the outer surface of the base body.

For the purpose of fixing the permanent magnets onto the rotor, these are first pre-fixed, at least two of the permanent magnet rows being so arranged as to be mutually offset in an axial direction. The pre-fixing serves merely to compensate for the weight of the permanent magnets. The first locking plate and the second locking plate are then attached to the two end faces of the rotor. It is also conceivable to attach the two locking plates to the rotor first, and subsequently fix the permanent magnets onto the rotor. The two locking plates each feature a surface which faces the permanent magnet rows in an axial direction, and which is so embodied as to be stepped in a circumferential direction.

In this case, a step which is higher in an axial direction and forms part of the first locking plate, for example, is assigned to a permanent magnet row that is axially indented in comparison with other permanent magnet rows. Therefore the axial end of this indented permanent magnet row is further away, compared with other permanent magnet rows, from the rotor end face on which the first locking plate rests.

As a result of the stepped contour at the respective magnet bearing surface of the locking plates, the magnets are so positioned as to be slightly offset axially. The magnets can be compressed axially and almost without gaps by means of the locking plates, wherein the offset arrangement in an axial direction of at least two of the permanent magnet rows prevents a continuous gap in a circumferential direction. By virtue of the axially offset arrangement of at least two of the permanent magnet rows, no continuous gaps occur in a circumferential direction, i.e. a bandage tension direction, and the magnets are pressed into a block almost without gaps by the locking plate.

As a result of this positioning of the permanent magnets, higher bandage tensions can be realized in the following work step. This is possible because the bandage tape is less easily damaged, as gaps in a circumferential direction between permanent magnets are smaller and above all continuous gaps extending around the entire circumference of the rotor are eliminated completely. It is therefore possible to apply the bandage to the armature using the maximum permitted pretension for the bandage tape concerned, without parts of the bandage being pulled into some of the gaps and without magnets being displaced from their ideal position.

By virtue of the higher bandage tensions that can be achieved, the radial fixing of the permanent magnets is improved because the bandage can absorb greater outward radial centrifugal forces during the operation of the rotor. Consequently, higher maximum rotational speeds are possible in respect of the rotor and an electrical machine comprising such a rotor.

According to another advantageous feature of the present invention, immediately adjacent ones of the permanent magnet rows in a circumferential direction can be arranged in mutually offset relationship in the axial direction. By virtue of the offset arrangement in an axial direction of permanent magnet rows which are immediately adjacent in a circumferential direction, gaps in a circumferential direction and between permanent magnets are reduced to the smallest possible length, because such a gap corresponds to the width in a circumferential direction of a single permanent magnet row, plus the width of the axial gap if applicable. This arrangement of the permanent magnet rows is therefore a particularly effective means of avoiding gaps in a circumferential direction, which could damage the bandaging. The radial fixing of the permanent magnets is thereby further improved, allowing high rotational speeds of the rotor.

According to another advantageous feature of the present invention, every second one of the permanent magnet rows in a circumferential direction can be arranged in mutually offset relationship in the axial direction. As a result of an axial offset between every second adjacent permanent magnet row in a circumferential direction, an elongation of the gap between permanent magnets in a circumferential direction is made possible, wherein such a gap is already sufficient in certain applications. However, a particularly advantageous effect is achieved in particular in combination with an offset between permanent magnet rows which are immediately adjacent in a circumferential direction, since a bandage tape covers particularly small gaps in a circumferential direction during a complete revolution around the rotor, while only every third gap in a circumferential direction occurs at the same axial position.

Other arrangements of the permanent magnet rows are, of course, also possible. For example, permanent magnet rows which are even further apart in a circumferential direction can be so arranged as to be mutually offset.

According to another advantageous feature of the present invention, at least one of the first and second locking plates can have finger springs which extend radially outward and has ends resting on the axial ends of the permanent magnet rows. The finger springs exert a spring force on the respective permanent magnet row because the finger springs are elastic. In this case, the respective spring force of the respective finger springs is configured such that the magnets are pushed together axially almost without gaps. The segmentation of the contour of the locking plate allows an individual axial spring force to be applied to the permanent magnet rows. The finger springs of the locking plate define the respective axial end of the permanent magnet rows and the axial offset between permanent magnet rows.

According to another advantageous feature of the present invention, at least one of the first and second locking plates can be embodied as a punched sheet. Such a locking plate is particularly simple and inexpensive to manufacture, and at the same time is sufficiently robust to position the permanent magnet rows reliably in an axial direction.

According to another advantageous feature of the present invention, the base body including the permanent magnets can be defined by a diameter which is dimensioned to at least correspond to a diameter of the locking plates. In particular, the bandaging of the rotor is simplified when the locking plates have a diameter which is slightly smaller than that of the rotor with permanent magnets attached thereto. For electrical machines often have a very small air gap between the rotor and the stator, and the start and the end of the rotor bandaging require rather more structural space in a radial direction than the remaining bandaging. By virtue of the locking plates having a somewhat smaller radial extension than the rest of the rotor, the start and the end of the bandaging can consequently take place in the axial region of the two locking plates, without having to configure a larger air gap of the electrical machine.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
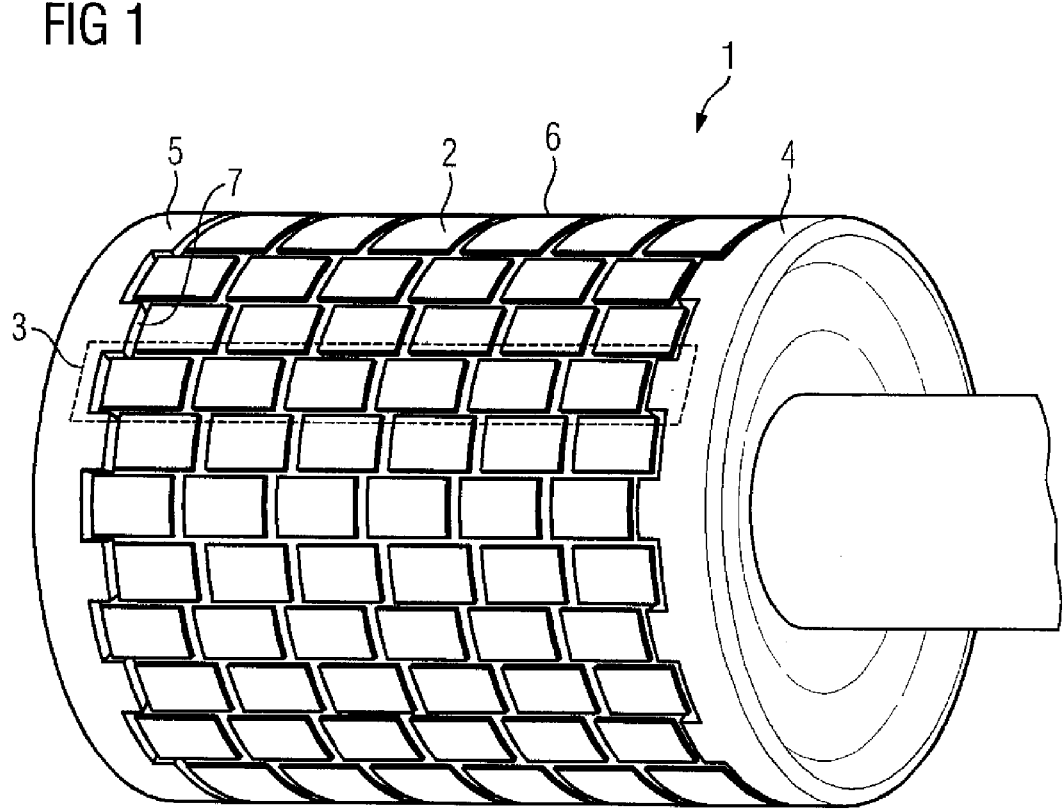
FIG. 1 is a perspective illustration of one embodiment of a rotor according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of one embodiment of a rotor according to the present invention, generally designated by reference numeral 1 and including a cylindrical base body, a first locking plate 4 at one end face and a second locking plate 5 at another end face of the base body. The base body of the rotor 1 has an outer surface 6, on which permanent magnets 2 are arranged in axially disposed permanent magnet rows 3. Not shown is a bandage, which is wound around the rotor 1 and fixes the permanent magnets 2 to the outer surface 6 of the rotor 1 in a radial direction.

The permanent magnet rows 3 are so arranged that permanent magnet rows 3 which are adjacent in a circumferential direction are mutually offset in an axial direction. Consequently, adjacent permanent magnet rows 3 also exhibit an offset at their respective axial ends. The first locking plate 4 and the second locking plate 5 are so embodied as to each have a surface 7 which faces toward the permanent magnet rows 3 and rests on the end of the permanent magnet rows 3. The respective surface 7 resting on the respective axial ends of the permanent magnet rows 3 fixes the pre-fixed permanent magnets 2 in an axial direction and allows an axially almost gap-free positioning of the permanent magnets 2. The axial offset of the permanent magnet rows 3 prevents a continuous gap in a circumferential direction, such that damage to the bandage tape can be avoided when the rotor 1 is bandaged. This ultimately allows greater bandage tension and therefore better radial fixing of the permanent magnets 2, allowing higher rotational speeds of the rotor.

Figure 2:
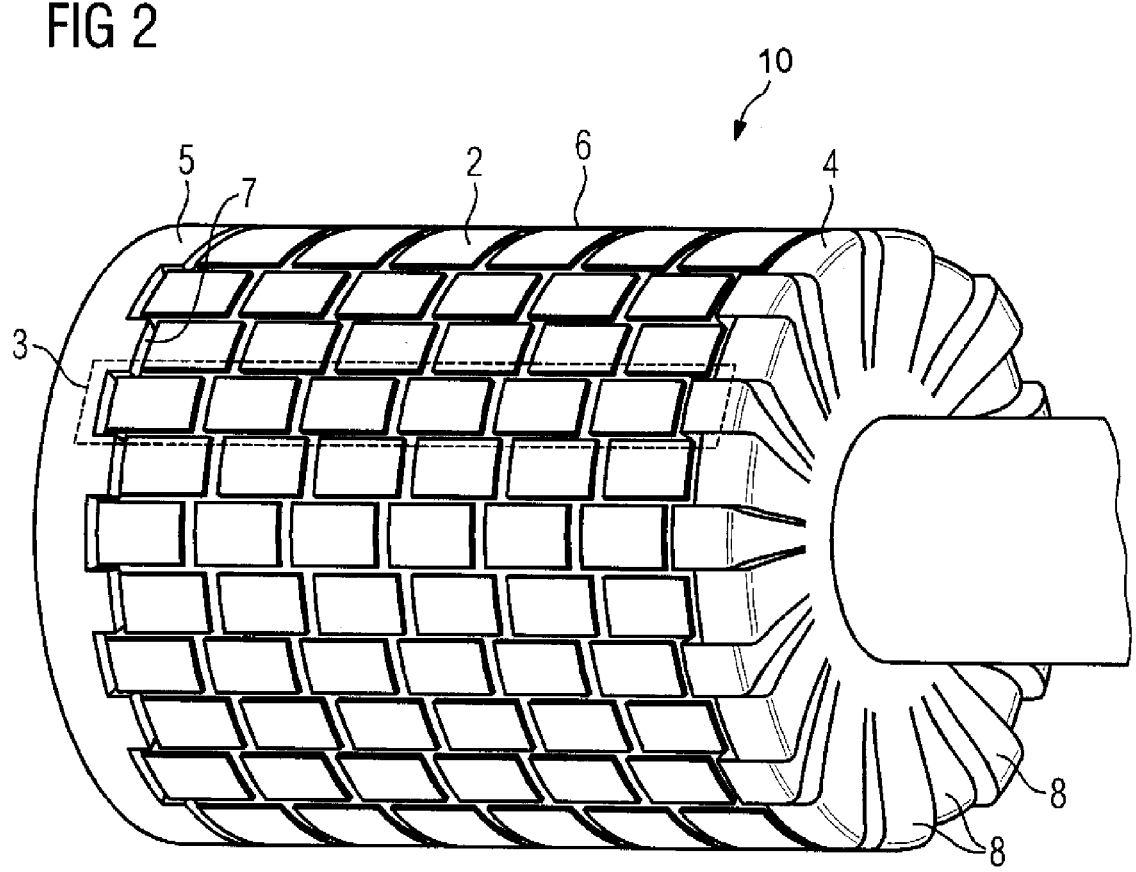
FIG. 2 is a perspective illustration of another embodiment of a rotor according to the present invention.

FIG. 2 shows a perspective illustration of another embodiment of a rotor 1 according to the present invention, generally designated by reference numeral 10. Parts corresponding with those in FIG. 1 are denoted by identical reference numerals and not explained again. The description below will center on the differences between the embodiments. In this embodiment, the first locking plate 4 is arranged at one of the end faces of the rotor 1 and has finger springs 8 which extend radially outward. A plurality of permanent magnets 2 form permanent magnet rows 3 in an axial direction, wherein the respective end of the finger springs 8 rests on the respective axial ends of permanent magnet rows 3.

In summary, the invention relates to a rotor for an electrical machine, comprising a plurality of permanent magnets arranged on the outer surface of the rotor in axially disposed permanent magnet rows, a first locking plate arranged at one end face of the rotor, and a second locking plate arranged at the other end face of the rotor, wherein the permanent magnet rows can be fixed in an axial direction by the two locking plates, and wherein a bandage is wound around the rotor such that the permanent magnets can be fixed to the outer surface of the rotor by the bandage. In order to provide rotors for electrical machines which can be operated at particularly high rotational speeds, it is proposed that at least two of the permanent magnet rows should be so arranged as to be mutually offset in an axial direction, and that the first locking plate and the second locking plate should each feature a surface which rests on the respective axial ends of the permanent magnet rows.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A rotor for an electrical machine, comprising:
    a base body;
    a plurality of permanent magnets arranged axially in rows on an outer surface of the base body, at least two of the permanent magnet rows being arranged mutually offset in an axial direction such that one of the rows of the permanent magnets extends in the axial direction so as to at least partially overlap the other one of the rows of the permanent magnets in the axial direction and to extend beyond the other one of the rows of the permanent magnets in the axial direction;
    first and second locking plates respectively arranged at axial end faces of the base body to secure the rows of permanent magnets in the axial direction, said first and second locking plates each having a plurality of finger springs which are spaced from each other in a circumferential direction and constructed so that each two of said finger springs located one after another in the circumferential direction rest on respective axial ends of two of said permanent magnet rows so that respective axial portions of the each two finger springs are offset relative to each other in the axial direction; and
    a bandage wound around the base body to fix the permanent magnets to the outer surface of the base body.

2. The rotor of claim 1, wherein immediately adjacent ones of the permanent magnet rows in a circumferential direction are arranged in mutually offset relationship in the axial direction.

3. The rotor of claim 1, wherein every second one of the permanent magnet rows in a circumferential direction is arranged in mutually offset relationship in the axial direction.

4. The rotor of claim 1, wherein at least one of the first and second locking plates is embodied as a punched sheet.

5. The rotor of claim 1, wherein the base body including the permanent magnets is defined by a diameter which is dimensioned to at least correspond to a diameter of the locking plates.

6. An electrical machine, comprising a rotor which includes a base body, a plurality of permanent magnets arranged axially in rows on an outer surface of the base body, at least two of the permanent magnet rows being arranged mutually offset in an axial direction such that one of the rows of the permanent magnets extends in the axial direction so as to at least partially overlap the other one of the rows of the permanent magnets in the axial direction and to extend beyond the other one of the rows of the permanent magnets in the axial direction, first and second locking plates respectively arranged at axial end faces of the base body to secure the rows of permanent magnets in the axial direction, said first and second locking plates each having a plurality of finger springs which are spaced from each other in a circumferential direction and constructed so that each two of said finger springs located one after another in the circumferential direction rest on respective axial ends of two of said permanent magnet rows so that respective axial portions of the each two finger springs are offset relative to each other in the axial direction; and
    and a bandage wound around the base body to fix the permanent magnets to the outer surface of the base body.

7. The electric machine of claim 6, wherein immediately adjacent ones of the permanent magnet rows in a circumferential direction are arranged in mutually offset relationship in the axial direction.

8. The electric machine of claim 6, wherein every second one of the permanent magnet rows in a circumferential direction is arranged in mutually offset relationship in the axial direction.

9. The electric machine of claim 6, wherein at least one of the first and second locking plates is embodied as a punched sheet.

10. The electric machine of claim 6, wherein the base body including the permanent magnets is defined by a diameter which is dimensioned to at least correspond to a diameter of the locking plates.

* * * * *